(12) United States Patent
Sturm et al.

(10) Patent No.: US 11,341,554 B1
(45) Date of Patent: May 24, 2022

(54) SOFTWARE PLATFORM TO MANAGE SHOPPERS TO FULFILL ORDERS FOR ITEMS RECEIVED BY AN ONLINE CONCIERGE SYSTEM

(71) Applicant: Maplebear, Inc., San Francisco, CA (US)

(72) Inventors: Nicholas William Sturm, Lake Forest, IL (US); Bryan Daniel Bor, Pittsburg, CA (US); Konrad Gustav Miziolek, San Francisco, CA (US); Ajay Pankaj Sampat, San Francisco, CA (US); Darren Bartholomew Johnson, Elko, NV (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/210,949

(22) Filed: Mar. 24, 2021

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0617* (2013.01); *G06Q 30/0222* (2013.01); *G06Q 30/0235* (2013.01); *G06Q 30/0635* (2013.01)

(58) Field of Classification Search
CPC .......... G06Q 30/0617; G06Q 30/0635; G06Q 30/0235; G06Q 30/0222
USPC ...................................................... 705/14.23
See application file for complete search history.

(56) References Cited

U.S. PATENT DOCUMENTS

| | | | |
|---|---|---|---|
| 9,697,529 B2* | 7/2017 | Fischer | G06Q 20/209 |
| 10,242,336 B1* | 3/2019 | Agarwal | G06Q 10/083 |
| 10,460,286 B2* | 10/2019 | Kliper | G06Q 20/20 |
| 11,038,808 B1* | 6/2021 | Damani | H04L 45/02 |
| 2012/0221402 A1* | 8/2012 | Brown | G06Q 30/02 705/14.35 |
| 2013/0246207 A1* | 9/2013 | Novak | G06Q 30/0641 705/26.2 |
| 2014/0074743 A1* | 3/2014 | Rademaker | G06Q 10/083 705/334 |
| 2015/0199634 A1* | 7/2015 | Butler | G06Q 30/0635 705/7.17 |
| 2016/0335576 A1* | 11/2016 | Peng | G06Q 10/06315 |
| 2017/0011449 A1* | 1/2017 | Mueller | G06Q 30/0635 |
| 2017/0024393 A1* | 1/2017 | Choksi | G06F 16/24578 |

(Continued)

*Primary Examiner* — Dipen M Patel
(74) *Attorney, Agent, or Firm* — Fenwick & West LLP

(57) ABSTRACT

An online concierge system receives orders from users that include items from one or more warehouses. The online concierge system identifies the orders to shoppers, who select one or more orders to fulfill. The online concierge system uses models to estimate orders likely to be received at different times and shoppers likely to be available to fulfill orders at different times. Responsive to greater than a threshold difference between estimated orders and estimated shoppers during a time interval, the online concierge system selects one or more incentives for shoppers to select orders during the time interval to entice shoppers to select orders during the time interval. An interface displayed to the shoppers by the online concierge system may present a map of warehouses and their estimated number of orders and allow shoppers to identify incentives offered for fulfilling orders at different warehouses during the time interval.

13 Claims, 6 Drawing Sheets

(56) References Cited

U.S. PATENT DOCUMENTS

| | | | | |
|---|---|---|---|---|
| 2017/0046644 A1* | 2/2017 | Zhang | .............. | G06Q 10/06315 |
| 2017/0154348 A1* | 6/2017 | Biswas | .............. | G06Q 30/0206 |
| 2018/0189729 A1* | 7/2018 | Droege | ............ | G06Q 10/08355 |
| 2018/0268462 A1* | 9/2018 | Brown | ............... | G06Q 10/0833 |
| 2019/0236740 A1* | 8/2019 | Rao | ....................... | G06Q 10/067 |
| 2020/0372439 A1* | 11/2020 | Zhang | ............ | G06Q 10/063118 |

\* cited by examiner

SOFTWARE PLATFORM TO MANAGE SHOPPERS TO FULFILL ORDERS FOR ITEMS RECEIVED BY AN ONLINE CONCIERGE SYSTEM

BACKGROUND

This disclosure relates generally to ordering an item through an online concierge system, and more specifically to the online concierge system facilitating shoppers to fulfill orders for items received by the online concierge system.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. Current online concierge systems may send shoppers to various warehouses with instructions to fulfill orders for items, and the shoppers then find the items included in the user order in a warehouse.

A number of shoppers available to fulfill orders received by the online concierge system varies over time, resulting in different numbers of shoppers capable of fulfilling orders the online concierge system receives at different times. Times for fulfilling orders are unable to be predicted by the online concierge system, while the online concierge system is unable to accurately estimate or predict availability of shoppers to fulfill orders at different times. As an online concierge system receives different numbers of orders that are to be fulfilled at different times, the online concierge system may have a greater number of orders to be fulfilled at a time when fewer shoppers are available to fulfill the orders, the online concierge system may encounter times when there is a gap between a number of orders to be fulfilled and a number of shoppers available to fulfill the orders.

SUMMARY

An online concierge system receives orders from users, with an order from a user identifying items from a warehouse for purchase and delivery to the user. The order may also include a delivery time specifying a date and a time range for the items to be delivered to the user. Various orders are identified to a shopper by the online concierge system, and the shopper selects one or more orders to fulfill. The shopper subsequently retrieves the items identified by the order from the identified warehouse and delivers the items to a location specified by the user to fulfill the order.

As shoppers select orders that the online concierge system has received from users for fulfillment, the ability of the online concierge system to fulfill orders varies depending on availability of shoppers to select and to fulfill orders, as well as geographic locations in which the orders are to be fulfilled. The online concierge system may identify a geographic location, or a specific warehouse, to estimate orders to be received during one or more time intervals and to estimate a number of shoppers available for fulfilling orders during the one or more time intervals. To compensate for variable availability of shoppers at different time intervals for a geographic location or for a warehouse, the online concierge system determines an estimated number of orders at one or more time intervals and determines an estimated number of shoppers available at the one or more time intervals. In various embodiments, the online concierge system uses a trained machine learned model to determine the estimated number of orders during a time interval based on previously received orders and characteristics of the time interval (e.g., weekday or weekend, time of day, day of the week, day of the month, etc.). Similarly, the online concierge system determines the estimated number of shoppers available at a time interval for the geographic location or for the warehouse via a trained machine learned model based on historical numbers of shoppers available at different times and characteristics of the time interval (e.g., weekday or weekend, time of day, day of the week, day of the month, etc.), as well as the geographic location.

For the geographic location or the warehouse, the online concierge system compares the estimated number of orders to the estimated number of shoppers for different time intervals during which the online concierge system determined an estimated number of orders and determined an estimated number of shoppers. In some embodiments, the online concierge system determines an estimated number of orders and similarly determines 510 an estimated number of shoppers for each hour in a day and compares the estimated number of orders for the geographic location to the estimated number of shoppers for the geographic location. Responsive to determining the estimated number of orders for the time exceeds the estimated number of shoppers for the time interval by at least a threshold amount, the online concierge system identifies the time interval and the geographic location as having a supply gap, indicating the number of estimated shoppers during the time and within the geographic location has at least a threshold likelihood of being insufficient to fulfill the estimated number of orders during the time interval at the geographic location.

To mitigate a difference between the number of estimated shoppers and the number of estimated orders during a time interval identified as having a supply gap, the online concierge system may offer one or more incentives to offer to shoppers during the identified time. An incentive offered by the online concierge system provides additional prompting or additional compensation to a shopper for selecting an order during a time interval, such as a time interval having the supply gap. For example, an incentive offers a shopper increased compensation per order selected by and fulfilled by the shopper during the time interval. As another example, an incentive offers a shopper an additional amount of compensation in response to the shopper selecting and fulfilling a threshold number of orders during the time interval. Different incentives may have different time intervals in some embodiments, while in other embodiments different incentives have a common time interval. An incentive offered by the online concierge system is associated with a specific warehouse in some embodiments or is associated with a specific geographic region that includes one or more warehouses in some embodiments.

The online concierge system selects shoppers based on the geographic location for which the time interval with the supply gap was identified. For example, the online concierge system identifies the shoppers based on locations or preferences included in profiles maintained for shoppers that are within a threshold distance from the geographic location. In some embodiments, the online concierge system may use any other suitable criteria or combination of criteria to select shoppers.

For each of the selected shoppers, the online concierge system determines a probability of the shopper selecting an order for fulfillment within the geographic location during the time interval identified as having a supply gap. In various embodiments, the online concierge system determines the probability of the shopper selecting an order by applying a trained acceptance model to characteristics of the shopper, such as a frequency with which a shopper has previously selected or has fulfilled an order within the geographical location, dates or times when the shoppers has previously selected or fulfilled orders within the geographical location, and any other suitable characteristics of the user. The acceptance model is a machine learned model trained on characteristics of users who previously fulfilled orders and characteristics of the orders that the users fulfilled.

To evaluate different incentives for offering to shoppers to increase the probability of the shoppers selecting or fulfilling orders during the identified time interval having the supply gap, the online concierge system determines an incentivized probability for each of the selected users for each of a set of candidate incentives. Different candidate incentives have one or more different characteristics (e.g., different amounts of compensation offered, different criteria for receiving compensation, etc.). The online concierge system stores incentivized probabilities for different combinations of candidate incentives and an identified of the selected shopper for whom the incentivized probabilities were determined. To determine an incentivized probability for a selected shopper and a candidate incentive, the online concierge system applies the trained acceptance model to the characteristics of a shopper and to characteristics of a candidate incentive. Example characteristics of a candidate incentive include an amount of compensation to the shopper provided by the candidate incentive, a duration of the candidate incentive, conditions to be satisfied by the shopper to receive compensation from the candidate incentive, a warehouse associated with the candidate incentive, a geographic location in which the candidate incentive is offered, or any other suitable characteristics describing the candidate incentive.

Based on probabilities of selected shoppers selecting an order when no incentive is offered and probabilities of selected shoppers selecting an order when one or more candidate incentives are offered, the online concierge system selects one or more incentives from the candidate incentives to offer to shoppers during the identified time interval with a supply gap within the geographic region. In various embodiments, the online concierge system selects different incentives for shoppers having one or more different characteristics. For example, the online concierge system groups shoppers based on probabilities of the shoppers selecting an order when an incentive is not offered. In some embodiments, each group of shoppers corresponds to a different range of probabilities of selecting an order when an incentive is not offered. The online concierge system selects an incentive for each group from the candidate incentives. In some embodiments, the online concierge system selects an incentive for a group based on increases between probabilities of users of the group selecting an order when an incentive is not offered and probabilities of users of the group selecting an order when candidate incentives are offered. For example, the online concierge system selects an incentive for users in a group resulting in a maximum increase between probabilities of users of the group selecting an order when an incentive is not offered and probabilities of users in the group selecting the order when the incentive is offered. The incentive selected for a group of shoppers seeks to optimize selection of orders during the identified time by shoppers of the group to reduce the supply gap between estimated orders and estimated shoppers during the identified time at the geographic location. A selected incentive is stored in association with an identifier of the group of shoppers or in association with identifiers of shoppers included in the group for which the incentive was selected.

In response to receiving a request for available orders from a shopper, the online concierge system transmits an interface to a client device of the shopper for display via the shopper mobile application, or another application, to the shopper. The interface identifies one or more incentives offered to the shopper in conjunction with information identifying orders to which the incentives apply. For example, the online concierge system obtains an identifier of the shopper from the received request and retrieves one or more incentives associated with the identifier of the shopper or associated with a group including the identifier of the shopper. The interface transmitted to the client device displays a description of the retrieved one or more incentives. The interface may also include identifiers of one or more orders for which one or more incentives are offered (i.e., orders having fulfillment times within the identified time having a supply gap). The interface may describe the compensation offered by the incentive, a time interval during which each of the one or more incentives are offered, and one or more criteria to be fulfilled for the shopper to receive the compensation offered by the incentive. In some embodiments, the interface displays information identifying one or more incentives offered within a threshold amount of time of a time when the shopper requests available orders, allowing the interface to identify upcoming incentives to be offered to the shopper.

Additionally, the interface may include a map identifying a geographic region, such as a geographic region specific by the shopper or stored in association with the shopper by the online concierge system, and warehouses within the geographic region. The shopper may specify a time via the interface, and the interface identifies incentives offered during the specified time interval at warehouses included in the geographic region. In various embodiments, the interface visually distinguishes warehouses, or geographic regions, where an incentive is offered during the specified time interval from warehouses, or geographic regions, where an incentive is not offered during the specified time interval. For example, warehouses or geographic regions where an incentive is offered during the specified time interval are displayed with a different icon or with a different color than those used to display warehouses or geographic regions where an incentive is not offered during the specified time interval. Further, the interface may display the estimated number of orders for the geographic region, or for the warehouse, during the specific time interval as an overlay on the map or in conjunction with the map, providing the shopper with an estimated level of business for the geographic region or for the warehouse during the specified time interval. Similarly, the interface may display the estimated number of shoppers available to fulfill orders during the specified time within the geographic region or within the warehouse, allowing the shopper to gauge a number of other shoppers potentially fulfilling orders in the same warehouse or geographic location during the specified time interval.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
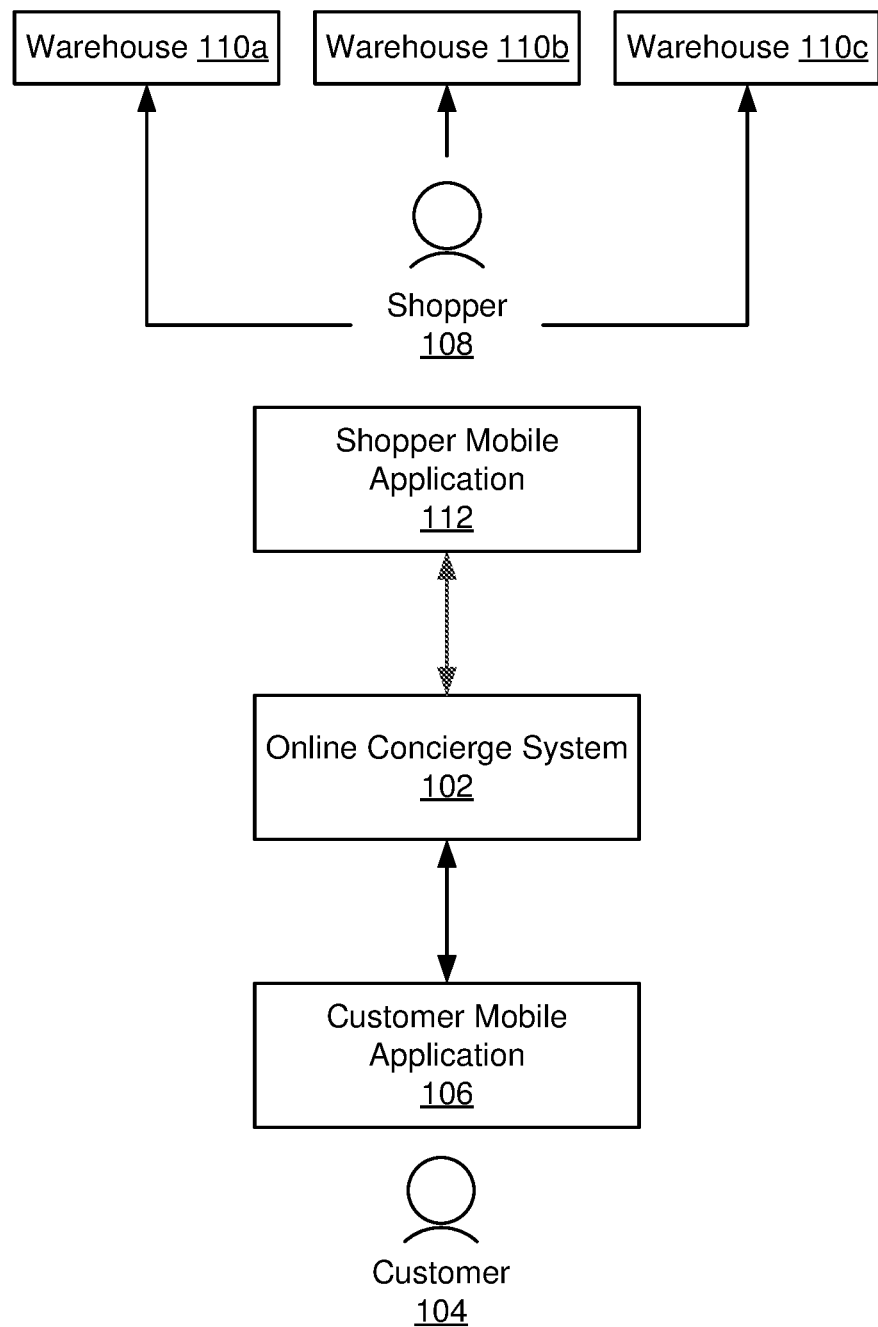
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
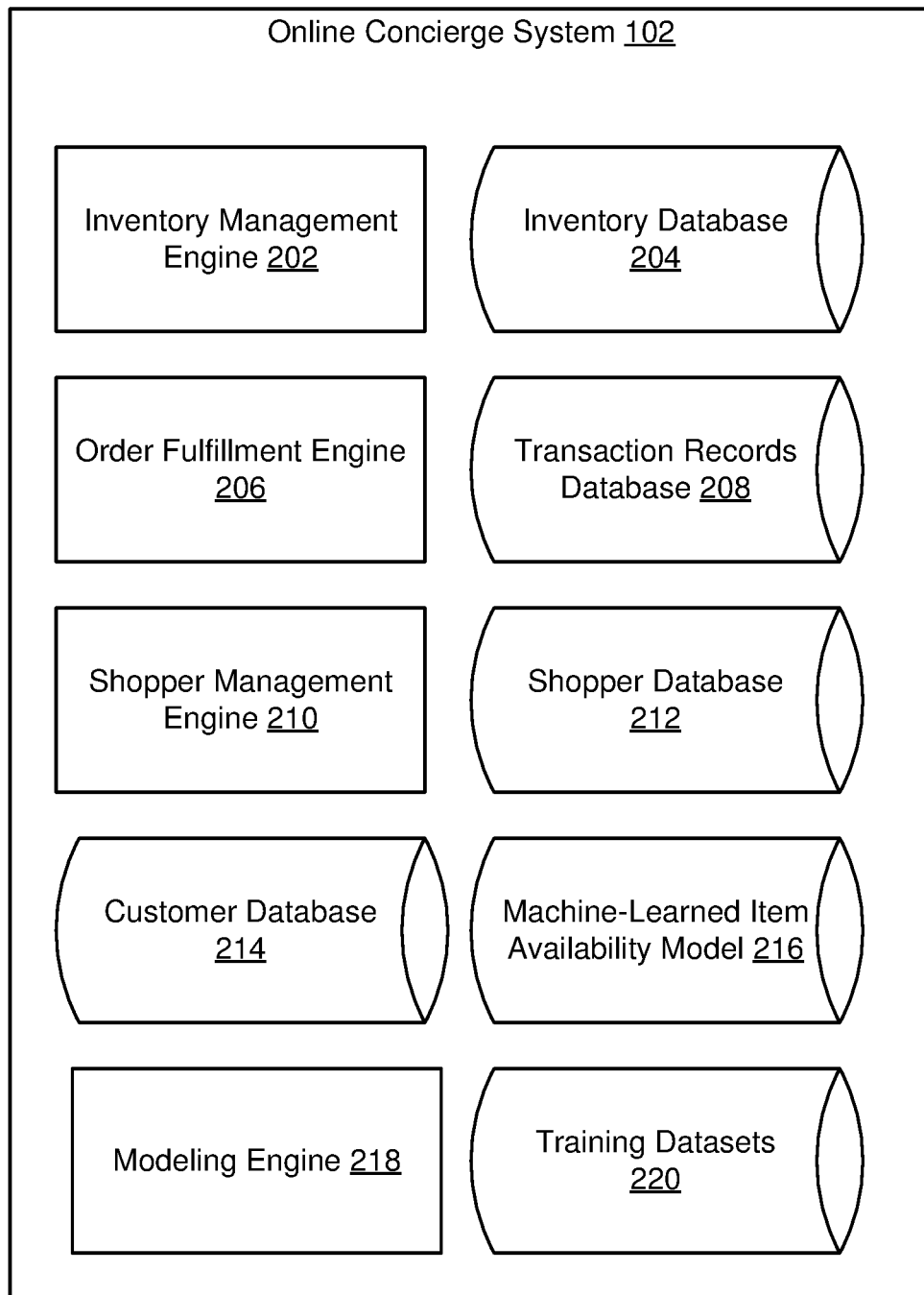
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

Additionally, the shopper management engine 210 determines whether to offer one or more incentives to shoppers to encourage shoppers to select particular orders for fulfillment. As further described below in conjunction with FIG. 5, the shopper management engine 210 estimates a number of orders to be fulfilled during various time intervals and estimates numbers of shoppers likely to be available for fulfilling the orders during the various time intervals using one or more trained models. In response to identifying a time interval where an estimated number of orders exceeds an estimated number of shoppers, the shopper management engine 210 selects one or more incentives to offer shoppers during the identified time interval. An incentive offered by the shopper management engine 210 provides increased compensation to shoppers for selecting or for fulfilling orders during the identified time interval. An incentive may have one or more criteria for the shopper to satisfy before receiving the increased compensation from the incentive. As further described below in conjunction with FIG. 5, the shopper management engine 210 accounts for probabilities of shoppers selecting or fulfilling orders during the identified time interval without an incentive and probabilities of shoppers selecting or fulfilling orders during the identified time interval when different incentives are offered during the identified time interval to select the incentive to offer during the identified time interval. The shopper management module 210 identifies incentives and time intervals when incentives are offered to shoppers via one or more interfaces, as further described below in conjunction with FIGS. 6 and 7, to notify shoppers of incentives offered during various time intervals.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a purchase model, further described below in conjunction with FIGS. 5-7. The purchase model includes a user model and an item model that generate an embedding for a user and an embedding for an item, respectively. The user model generates the embedding for the user based on prior purchases by the user, preferences of the user, and any other suitable characteristics of the user. The item model generate the embedding for the item based on different words or phrases received by the online concierge system 102 as terms from users in interactions where the user selected the item, one or more categories associated with the item, popularity of the item at a warehouse 110, or any other suitable attributes of an item. From an embedding for the user and an embedding for an item, the purchase model determines a probability of the user purchasing the item, as further described below in conjunction with FIGS. 5 and 6. In various embodiments, the embedding for a user and the embedding for an item have an equal number of dimensions, and the purchase model generates the probability of the user purchasing the item based on a dot product or other measure of similarity between the embedding for the user and the embedding for the item.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
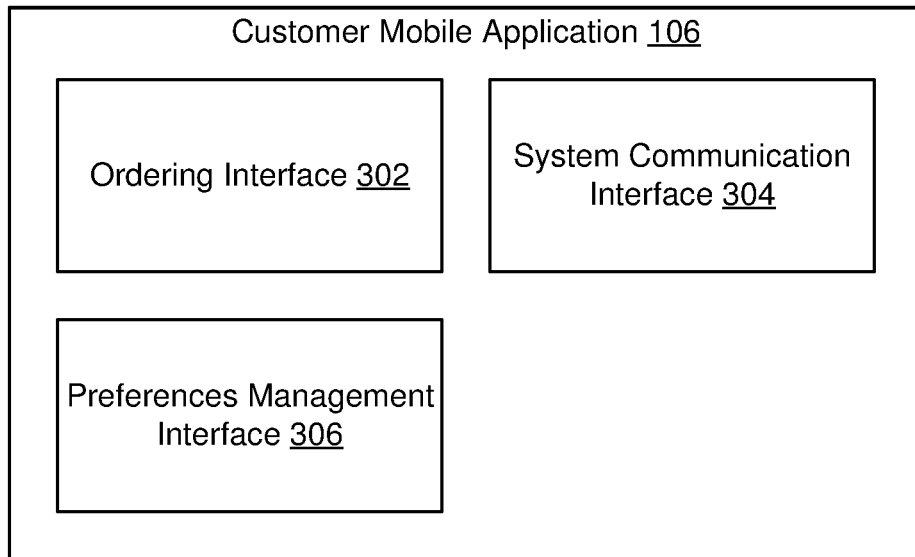
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
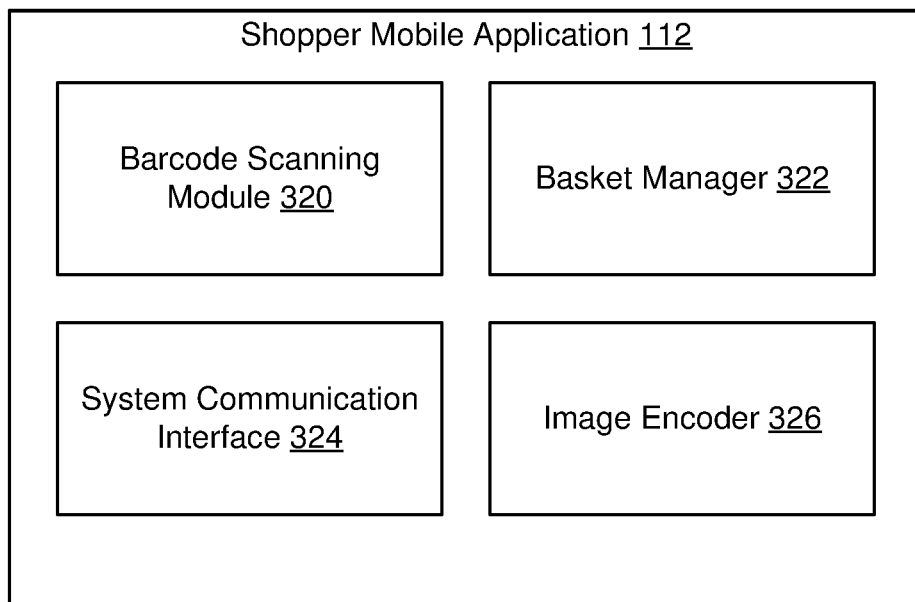
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

Figure 4:
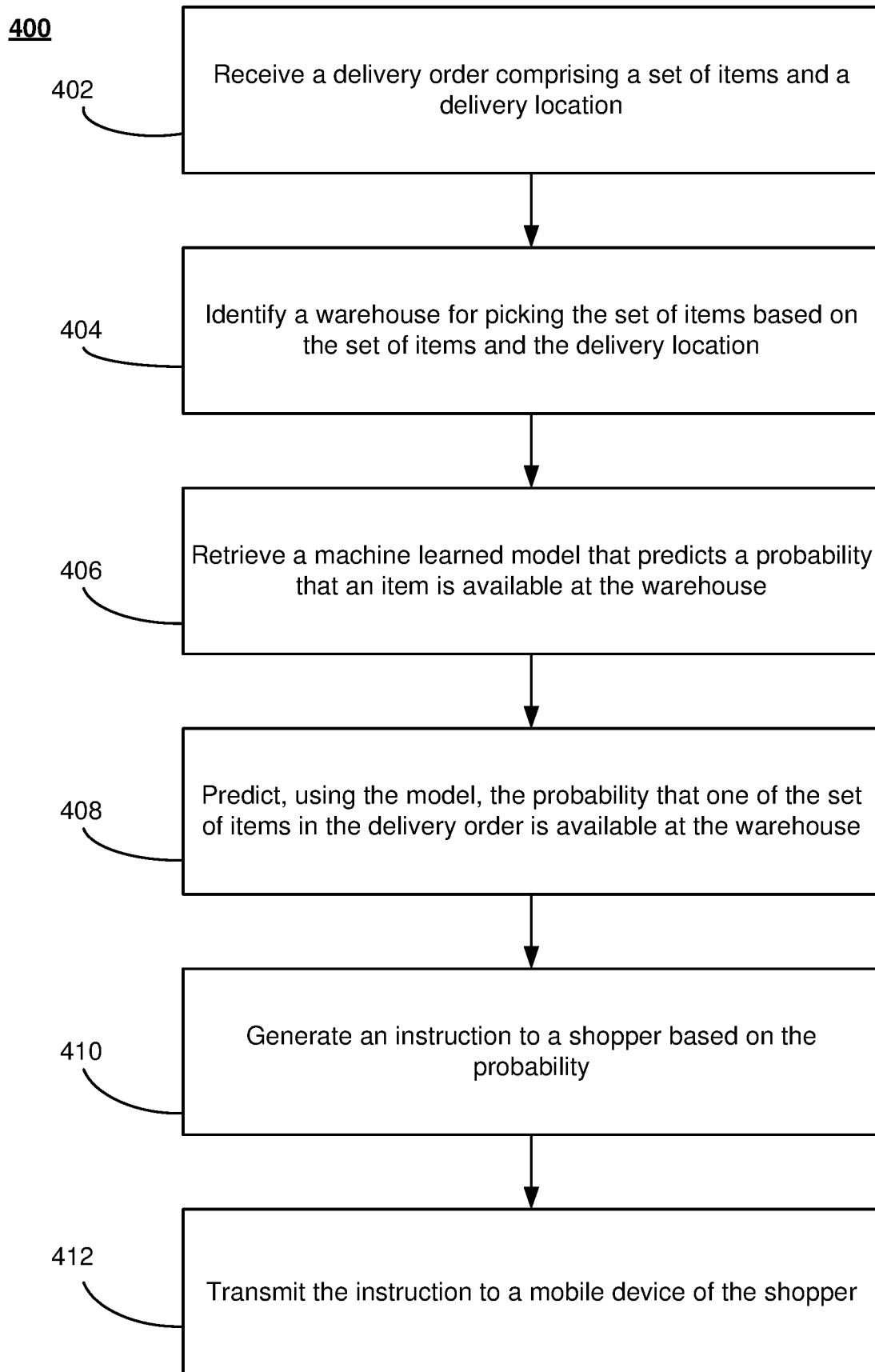
FIG. 4 is a flowchart of a method for predicting inventory availability, according to one embodiment.

As described with reference to FIG. 2, the machine-learned item availability model 216 of the online concierge system 102 can determine an availability of an item requested by the user 104. FIG. 4 is a flowchart illustrating a process 400 for predicting inventory availability, according to one embodiment. The online concierge system 102 receives 402 a delivery order that includes a set of items and a delivery location. The delivery location may be any location associated with a user, such as a user's home or office. The delivery location may be stored with the user location in the user database 214. Based on the delivery order, the online concierge system 102 identifies a warehouse 404 for picking the set of items in the delivery order based on the set of items and the delivery location. In some cases, the user specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouses stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a shopper. The order fulfillment engine 206 transmits the instruction to the shopper through the SMA 112 via the shopper management engine 210. The instruction is based on the predicted probability. In some examples, the shopper management engine 210 instructs the shopper to pick an item in the delivery order at a warehouse with the highest item availability score. For example, if a warehouse is more likely to have more items in the delivery order available than another warehouse, then the shopper management engine 210 instructs the shopper to pick the item at the warehouse with better availability. Other examples of the shopper management engine 210 instruction to the shopper are described in further detail with reference to FIGS. 5 and 6. In some other examples, the order fulfillment engine 206 sends a message and/or instruction to a user based on the probability predicted by the machine-learned item availability model 216.

Figure 5:
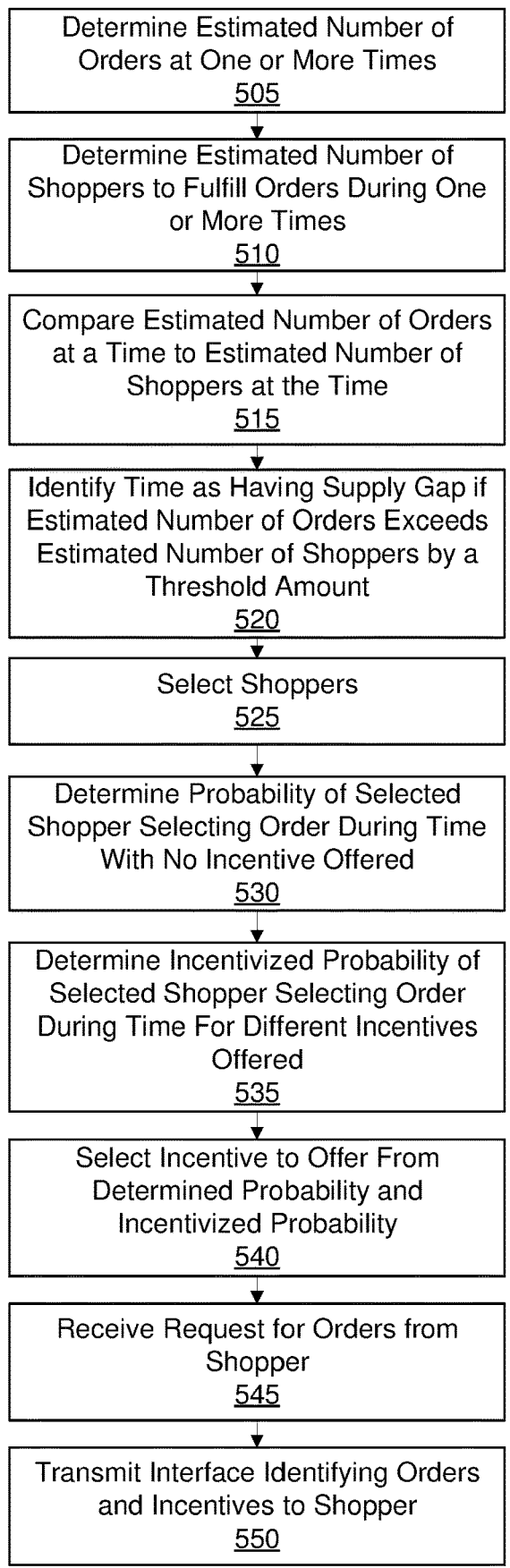
FIG. 5 is a flowchart of a method for determining incentives to for shoppers to fulfill orders received by an online concierge system, according to one embodiment.

Determining Incentives for Shoppers to Fulfill Orders Received by an Online Concierge System FIG. 5 is a flowchart of one embodiment of a method for determining incentives to for shoppers to fulfill orders received by an online concierge system 102. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments.

The online concierge system 102 receives orders from users, with an order from a user identifying items from a warehouse for purchase and delivery to the user. The order may also include a delivery time specifying a date and a time range for the items to be delivered to the user. Various orders are identified to a shopper by the online concierge system 102, and the shopper selects one or more orders to fulfill. The shopper subsequently retrieves the items identified by the order from the identified warehouse and delivers the items to a location specified by the user to fulfill the order.

As shoppers select orders that the online concierge system 102 has received from users for fulfillment, the ability of the online concierge system 102 to fulfill orders varies depending on availability of shoppers to select and to fulfill orders, as well as geographic locations in which the orders are to be fulfilled. The online concierge system 102 may identify a geographic location, or a specific warehouse 110, to estimate orders to be received during one or more time intervals and toe estimated a number of shoppers available for fulfilling orders during the one or more time intervals. To compensate for variable availability of shoppers at different time intervals, for a geographic location, the online concierge system 102 determines 505 an estimated number of orders at one or more time intervals and determines 510 an estimated number of shoppers available at the one or more time intervals. In various embodiments, the online concierge system 102 uses a trained machine learned model to determine 505 the estimated number of orders during a time interval based on previously received orders and characteristics of the time (e.g., weekday or weekend, time of day, day of the week, day of the month, etc.). Similarly, the online concierge system 102 determines 510 the estimated number of shoppers available at a time interval in the geographic location via a trained machine learned model based on historical numbers of shoppers available at different times and characteristics of the time interval (e.g., weekday or weekend, time of day, day of the week, day of the month, etc.), as well as the geographic location. The trained machine learned model for determining 505 the estimated number of orders at a time interval and the trained machine learned model for determining 510 the estimated number of shoppers at the time may be trained using any suitable method or combination of methods (e.g., supervised learning, unsupervised learning, semi-supervised learning, etc.).

In some embodiments, the online concierge system 102, additionally or alternatively determines 505 an estimated number of orders for individual warehouses 110 in the geographic location at different time intervals, allowing the online concierge system 102 to estimate a number of orders to be fulfilled from individual warehouses 110 at different times. Additionally, the online concierge system 102 may determine 510 an estimated number of shoppers for individual warehouses 110 in the geographic location at different times, allowing estimation of a number of shoppers likely to be fulfilling orders from specific warehouses 110 at different time intervals. Hence, the online concierge system 102 may estimate a number of orders expected at different time intervals for individual warehouses 110, as well as an estimated number of shoppers available for shopping at individual warehouses using the trained models.

For the geographic location, the online concierge system 102 compares 515 the estimated number of orders to the estimated number of shoppers for different time intervals during which the online concierge system 102 determined 505 an estimated number of orders and determined 510 an estimated number of shoppers. In some embodiments, the online concierge system 102 determines 505 an estimated number of orders for each hour in a day and similarly determines 510 an estimated number of shoppers for each hour in the day; for each hour, the online concierge system 102 compares 515 the estimated number of orders for the geographic location to the estimated number of shoppers for the geographic location. Responsive to determining the estimated number of orders for the time interval exceeds the estimated number of shoppers for the time interval by at least a threshold amount, the online concierge system 102 identifies 520 the time interval and the geographic location (or the time interval and the warehouse 110) as having a supply gap, indicating the number of estimated shoppers during the time interval and within the geographic location has at least a threshold likelihood of being insufficient to fulfill the estimated number of orders during the time interval at the geographic location (or at the warehouse 110).

To mitigate a difference between the number of estimated shoppers and the number of estimated orders during a time interval identified 520 as having a supply gap, the online concierge system 102 may offer one or more incentives to offer to shoppers during the identified time interval. An incentive offered by the online concierge system 102 provides additional prompting or additional compensation to a shopper for selecting an order during a time interval identified 520 having the supply gap. For example, an incentive offers a shopper increased compensation per order selected by and fulfilled by the shopper during the time interval. As another example, an incentive offers a shopper an additional amount of compensation in response to the shopper selecting and fulfilling a threshold number of orders during the time interval. Different incentives may have different time intervals in some embodiments, while in other embodiments different incentives have a common time interval. An incentive offered by the online concierge system 102 is associated with a specific warehouse 110 in some embodiments or is associated with a specific geographic region that includes one or more warehouses 110 in some embodiments.

In various embodiments, the online concierge system 102 maintains a budget for incentives offered during a time interval. The budget specifies a total amount of compensation available to be provided to shoppers during the time interval. To determine the budget allocated for a time interval, the online concierge system 102 may determine an average number of orders fulfilled in the geographic region or fulfilled from the warehouse 110 during the time interval and bases the budget allocated for incentives based on a difference between the estimated number of orders during the time interval and the average number of orders. Based on the budget for offering incentives during the time interval and the estimated number of orders to fulfill during the time interval, the online concierge system 102 determines an amount of compensation to offer for one or more incentives during the time interval. In some embodiments, the online concierge system 102 uses the determined budget to also determine a number of incentives offered during the time interval, so an aggregate amount offered across incentives offered during the time interval does not exceed the budget.

The online concierge system 102 selects 525 shoppers based on the geographic location for which the time with the supply gap was identified 520. For example, the online concierge system 102 identifies the shoppers based on locations or preferences included in profiles maintained for shoppers that are within a threshold distance from the geographic location. In some embodiments, the online concierge system 102 may use any other suitable criteria or combination of criteria to select 525 shoppers. For each of the selected shoppers, the online concierge system 102 determines 530 a probability of the shopper selecting an order for fulfillment within the geographic location during the time interval identified 520 as having a supply gap. In various embodiments, the online concierge system 120 determines 530 the probability of the shopper selecting an order by applying a trained acceptance model to characteristics of the shopper, such as a frequency with which a shopper has previously selected or has fulfilled an order within the geographical location, dates or times when the shoppers has previously selected or fulfilled orders within the geographical location, and any other suitable characteristics of the user. The acceptance model is a machine learned model trained on characteristics of users who previously fulfilled orders and characteristics of the orders that the users fulfilled. In various embodiments, the online concierge system 102 trains the acceptance model using any suitable method or methods (e.g., supervised learning, unsupervised learning, semi-supervised learning, etc.). The online concierge system 102 may train the acceptance model at a periodic interval (e.g., daily, weekly, monthly, etc.) in various embodiment to account for changing selection or fulfillment of orders by shoppers over time.

To evaluate different incentives for offering to shoppers to increase the probability of the shoppers selecting or fulfilling orders during the identified time interval when the geographical location, or the warehouse 110, has a supply gap, the online concierge system 102 determines 535 an incentivized probability for each of the selected users for each of a set of candidate incentives. Different candidate incentives have one or more different characteristics (e.g., different amounts of compensation offered, different criteria for receiving compensation, etc.). The online concierge system 102 stores incentivized probabilities for different combinations of candidate incentives and an identified of the selected shopper for whom the incentivized probabilities were determined. To determine 535 an incentivized probability for a selected shopper and a candidate incentive, the online concierge system 102 applies the trained acceptance model to the characteristics of a shopper, as further described above, and to characteristics of a candidate incentive. Example characteristics of a candidate incentive include an amount of compensation to the shopper provided by the candidate incentive, a duration of the candidate incentive, conditions to be satisfied by the shopper to receive compensation from the candidate incentive, a warehouse 110 associated with the candidate incentive, a geographic location in which the candidate incentive is offered, or any other suitable characteristics describing the candidate incentive. The acceptance model may be trained at a periodic interval (e.g., daily, weekly, monthly, etc.) in various embodiment to account for changing selection or fulfillment of orders by shoppers over time or as different incentives are offered to shoppers to select or to fulfill orders.

Based on probabilities of selected shoppers selecting an order when no incentive is offered and probabilities of selected shoppers selecting an order when one or more candidate incentives are offered, the online concierge system 102 selects 540 one or more incentives from the candidate incentives to offer to shoppers during the identified time interval with a supply gap within the geographic region (or at the warehouse 110). In various embodiments, the online concierge system 102 selects 540 different incentives for shoppers having one or more different characteristics. For example, the online concierge system 102 groups shoppers based on probabilities of the shoppers selecting an order when an incentive is not offered. In some embodiments, each group of shoppers corresponds to a different range of probabilities of selecting an order when an incentive is not offered. The online concierge system 102 selects 540 an incentive for each group from the candidate incentives. In some embodiments, the online concierge system 102 selects 540 an incentive for a group based on increases between probabilities of users of the group selecting an order when an incentive is not offered and probabilities of users of the group selecting an order when candidate incentives are offered. For example, the online concierge system 102 selects 540 an incentive for users in a group resulting in a maximum increase between probabilities of users of the group selecting an order when an incentive is not offered and probabilities of users in the group selecting the order when the incentive is offered. As an example, for each shopper in a group, the online concierge system 102 determines an increase between probabilities of the user of the group selecting an order when an incentive is not offered and probabilities the user in the group selecting the order when a candidate incentive is offered for each of at least a set of candidate incentives; for each of at least the set of candidate incentives, the online concierge system 102 determines an average increase between probabilities of the user of the group selecting an order when an incentive is not offered and probabilities the user in the group selecting the order when a candidate incentive is offered and selects 540 the candidate incentive having a maximum average increase for the group. However, the online concierge system 102 selects 540 a candidate incentive for a group of shoppers using any suitable method in various embodiments. The incentive selected 540 for a group of shoppers seeks to optimize selection of orders during the identified time interval by shoppers of the group to reduce the supply gap between estimated orders and estimated shoppers during the identified time interval at the geographic location or at the warehouse 110. A selected incentive is stored in association with an identifier of the group of shoppers or in association with identifiers of shoppers included in the group for which the incentive was selected 540.

In response to receiving 545 a request for available orders from a shopper, the online concierge system 102 transmits 550 an interface to a client device of the shopper for display via the shopper mobile application 112, or another application, to the shopper. The interface identifies one or more incentives offered to the shopper in conjunction with information identifying orders to which the incentives apply. For example, the online concierge system 102 obtains an identifier of the shopper from the received request and retrieves one or more incentives associated with the identifier of the shopper or associated with a group including the identifier of the shopper. The interface transmitted 550 to the client device displays a description of the retrieved one or more incentives. The interface may also include identifiers of one or more orders for which one or more incentives are offered (i.e., orders having fulfillment times within the identified time having a supply gap). The interface may describe the compensation offered by the incentive, a time interval during which each of the one or more incentives are offered, and one or more criteria to be fulfilled for the shopper to receive the compensation offered by the incentive. In some embodiments, the interface displays information identifying one or more incentives offered within a threshold amount of time of a time when the shopper requests available orders, allowing the interface to identify upcoming incentives to be offered to the shopper.

Figure 6:
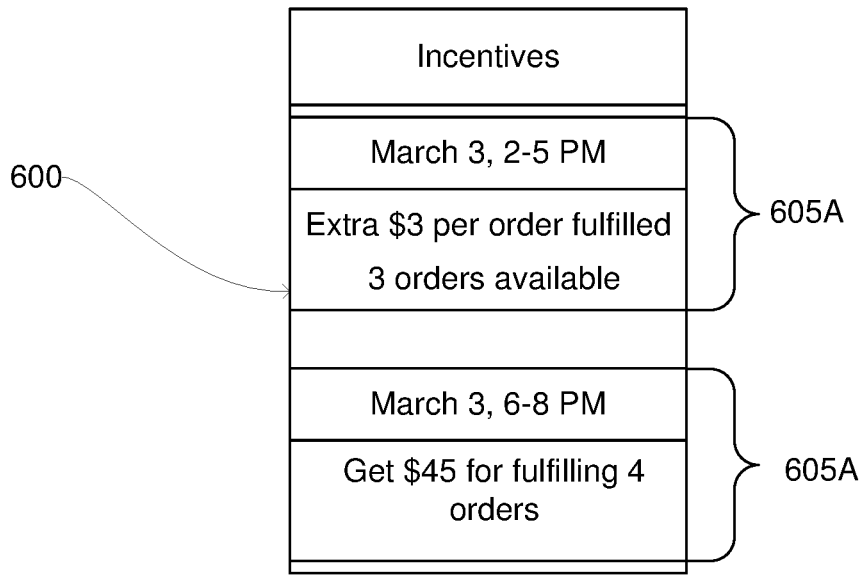
FIG. 6 is an example interface identifying incentives available to a shopper via the online concierge system, in accordance with an embodiment.

FIG. 6 shows one example of an interface 600 identifying incentives available to a shopper via the online concierge system 102. In the example of FIG. 6, the interface 600 displays descriptions 605A, 605B of incentives offered by the online concierge system 102 during a specified time. In some embodiments, the shopper to whom the interface 600 is displays specifies the time for which descriptions 605A, 605A of offered incentives are displayed. Alternatively, the online concierge system 102 identifies incentives offered at time intervals in response to the time intervals being within a threshold amount of time from a time when the interface 600 is displayed, allowing the interface 600 to display incentives offered at the time intervals in response to the time intervals being within the threshold amount of time from the time when the interface 600 is displayed, providing the shopper with notice of upcoming incentives being offered at one or more future times. In such an implementation, the interface 600 does not display information describing an incentive in response to the incentive being offered during a time interval greater than the threshold amount of time from the time when the interface 600 is displayed. A description 605A of an incentive identifies a time interval when the incentive is to be offered and an amount of compensation to the shopper from the incentive; additionally, a description 605A may identify orders the online concierge system 102 has received to be fulfilled during the time interval when the incentive is offered that are available to be selected by the shopper. While FIG. 6 shows the description 605A identifying a number of orders to be fulfilled during the time interval when the incentive is offered and available to be selected by the shopper, in other embodiments, the description 605A includes information describing different orders be fulfilled during the time interval when the incentive is offered and available to be selected by the shopper (e.g., a number of items in the order, a warehouse 110 for fulfilling the order, a user from whom the order was received, etc.). If an incentive includes one or more conditions to be satisfied for the shopper to receive compensation, the description 605 displayed for the incentive displays the one or more conditions along with the time interval when the incentive is to be offered and the amount of compensation to the shopper from the incentive.

Additionally, the interface may include a map identifying a geographic region, such as a geographic region specific by the shopper or stored in association with the shopper by the online concierge system 102, and warehouses 110 within the geographic region. The shopper may specify a time interval, or a time, via the interface, and the interface identifies incentives offered during the specified time interval, or during a time interval including the specified time, at warehouses 110 included in the geographic region. In various embodiments, the interface visually distinguishes warehouses 110, or geographic regions, where an incentive is offered during a time interval including specified time from warehouses 110, or geographic regions, where an incentive is not offered during the specified time. For example, warehouses 110 or geographic regions where an incentive is offered during the specified time (or time interval) are displayed with a different icon or with a different color than those used to display warehouses 110 or geographic regions 110 where an incentive is not offered during the specified time. Further, the interface may display the estimated number of orders for the geographic region, or for the warehouse 110, during the specific time, or time interval, as an overlay on the map or in conjunction with the map, providing the shopper with an estimated level of business for the geographic region or for the warehouse during the specified time. Similarly, the interface may display the estimated number of shoppers available to fulfill orders during the specified time, or time interval, within the geographic region or within the warehouse 110, allowing the shopper to gauge a number of other shoppers potentially fulfilling orders in the same warehouse 110 or geographic location during the specified time.

Figure 7:
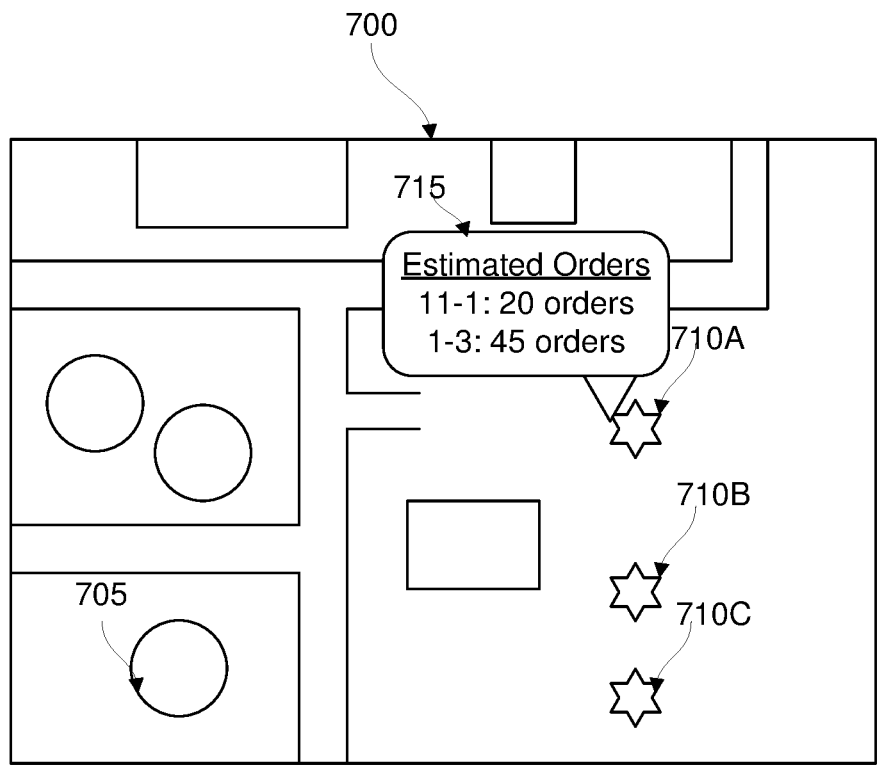
FIG. 7 is an example interface displaying a map identifying warehouses where incentives for fulfilling orders received by the online concierge system are offered, in accordance with an embodiment.

FIG. 7 shows an example interface 700 displaying a map identifying warehouses 110 where incentives for fulfilling orders received by the online concierge system 102 are offered. The map in the interface 700 may display a geographic region selected by a shopper or otherwise associated with a shopper and identifies warehouses 110 in the geographic region from which users may specify orders for fulfillment via the online concierge system 102. The interface 700 displays an icon 705 to identify warehouses 110 where an incentive is not offered to shoppers for fulfilling order and displays an alternative icon 710A, 710B, 710C to identify warehouses 110 for which the online concierge system 102 provides one or more offers 102 to the shopper for fulfilling orders during a time interval. While FIG. 7 uses the icon 705 and the alternative icon 710A, 710B, 710C to visually distinguish warehouses 110 where the online concierge system 102 is not offering an incentive from warehouses 110 during the time interval where the online concierge ssystem 102 is offering one or more incentives during the time interval, respectively, in other embodiments, the online concierge system 102 may use any suitable method to visually differentiate warehouses 110 where no incentive is offered from warehouses 110 where an incentive is offered. In some embodiments, the interface 700 displays a warehouse 110 with the alternative icon 710A, 710B, 710C in response to the online concierge system 102 offering an incentive for fulfilling orders at the warehouse 110 at a time interval within a threshold amount of time from a time when the interface 700 is displayed, allowing the shopper to identify upcoming incentives at a warehouse 110.

In some embodiments, in response to the shopper selecting an alternative icon 710A 710B, 710C of a warehouse 110 for which an incentive is to be offered, the interface 700 displays a notification 715 identifying estimated numbers of orders to be fulfilled at the warehouse 110 during the time interval when the incentive is offered. In some embodiments, the notification 715 identifies estimated numbers of orders to be fulfilled at the warehouse 110 during time intervals when an incentive for fulfilling orders at the warehouse 110 is offered. In the example of FIG. 7, the notification 715 identifies the estimated number of orders during one or more time intervals determined by the online concierge system 102, as further described above in conjunction with FIG. 5. While the notification 715 in FIG. 7 identifies estimated numbers of orders during one or more time intervals, the notification 715 may additionally or alternatively identify an estimated number of shoppers for fulfilling orders during the one or more time intervals or any other suitable information. Further, the notification 715 in FIG. 7 is shown as an overlay on the map proximate to the alternative icon 710A of a warehouse 110 selected by the shopper, the notification 715 may be displayed in a different portion of the interface 700 than the map in some embodiments and include a description of the selected warehouse 110 or may be displayed in a separate interface shown in place of the map in other embodiments.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   determining, by an online concierge system, an estimated number of orders to be fulfilled during a time interval from a plurality of warehouses based on orders previously received by the online concierge system for the plurality of warehouses;
   training, by the online concierge system, a machine-learned item availability model to predict a probability of an item being available at a warehouse of the plurality of warehouses, by:
      using training datasets that include warehouses, characteristics of items included in previously received orders, and times when previously received orders were received by the online concierge system;
      receiving updated availability of a plurality of items at the plurality of warehouses from shoppers; and
      updating training datasets based on the updated availabilities of the plurality of items at the plurality of warehouses;
   retraining the machine-learned item availability model by applying the machine learned-item availability model to the updated training datasets including the warehouses, the characteristics of items included in previously received orders, times when previously received orders were received by the online concierge system, and updated availabilities of the plurality of items at the plurality of warehouses received from the shoppers;
   determining, by the online concierge system, an estimated number of shoppers available to fulfill received orders from the warehouse of the plurality of warehouses during the time interval from prior fulfillment of orders by shoppers;

responsive to the estimated number of orders exceeding the estimated number of shoppers by at least a threshold amount, determining probabilities of one or more shoppers selecting an order to be fulfilled during the time interval without the online concierge system offering an incentive for fulfilling the order, determining incentivized probabilities of the one or more shoppers selecting the order to be fulfilled during the time interval when the online concierge system offers each of one or more incentives for fulfilling the order, selecting an incentive for the online concierge system to offer for fulfilling the order based on differences between the probabilities and the incentivized probabilities;

receiving a request from a shopper for orders available to be fulfilled, each order including one or more items for the shopper to obtain;

transmitting an interface from the online concierge system to a shopper mobile application executing on a client device of the shopper, the interface including an instruction based on a highest predicted probability output by the retrained the machine-learned item availability model for a combination of the warehouse of the plurality of warehouses and the item, and the interface describing the selected incentive and the time interval when the selected incentive applies, the interface displaying a map of a geographic location including representations of warehouses of the plurality of warehouses for fulfilling one or more orders in the geographic location with a representation of the warehouse of the plurality of warehouses to which the selected incentive applies visually distinguished from representations of one or more warehouses of the plurality of warehouses to which the selected incentive does not apply; and responsive to receiving a selection of the warehouse of the plurality of warehouses to which the selected incentive applies via the interface, displaying a notification identifying the estimated number of orders to be to be fulfilled for the warehouse of the plurality of warehouses during the time interval determined by the online concierge system from orders previously received by the online concierge system as an overlay on the map proximate to the representation of the warehouse of the plurality of warehouses.

2. The method of claim 1, wherein the interface displays the selected incentive in conjunction with information identifying one or more orders to which the selected incentive applies.

3. The method of claim 1, wherein the interface describes the selected incentive in response to the time interval being within a threshold amount of time from a time when the interface is transmitted.

4. The method of claim 3, wherein the interface does not describe the selected incentive in response to the time interval being greater than the threshold amount of time from the time when the interface is transmitted.

5. The method of claim 1, wherein the interface displays an amount of compensation the shopper receives from the incentive and one or more criteria to be satisfied by the shopper to receive the amount of compensation.

6. The method of claim 1, wherein selecting the incentive for the online concierge system to offer for fulfilling the order based on differences between the probabilities and the incentivized probabilities comprises:

grouping shoppers based on probabilities of the shoppers selecting one or more orders to be fulfilled during the time interval when no incentive is offered, different groups including shoppers having probabilities within different ranges; and selecting an incentive from the one or more incentives for a group based on increases between probabilities of shoppers in the group selecting one or more orders during the time interval when no incentive is offered and incentivized probabilities of shoppers in the group selecting one or more orders during the time interval when different incentives are offered.

7. The method of claim 6, wherein transmitting the interface from the online concierge system to a client device of the shopper, the interface describing the selected incentive and the time interval when the selected incentive applies comprises:

identifying a group of shoppers including the shopper;

identifying the incentive selected for the group of shoppers including the shopper; and transmitting the interface describing the incentive selected for the group of shoppers including the shopper.

8. A method comprising:

determining, by an online concierge system, an estimated number of orders to be fulfilled for a geographic location during a time interval from a plurality of warehouses based on orders previously received by the online concierge system for the plurality of warehouses;

training, by the online concierge system, a machine-learned item availability model to predict a probability of an item being available at a warehouse of the plurality of warehouses, by:

using training datasets that include warehouses, characteristics of items included in previously received orders, and times when previously received orders were received by the online concierge system;

receiving updated availability of a plurality of items at the plurality of warehouses from shoppers; and updating training datasets based on the updated availabilities of the plurality of items at the plurality of warehouses;

retraining the machine-learned item availability model by applying the machine learned-item availability model to the updated training datasets including the warehouses, the characteristics of items included in previously received orders, times when previously received orders were received by the online concierge system, and updated availabilities of the plurality of items at the plurality of warehouses received from the shoppers;

determining, by the online concierge system, an estimated number of shoppers available to fulfill received orders within the geographic location during the time interval from prior fulfillment of orders by shoppers;

responsive to the estimated number of orders exceeding the estimated number of shoppers by at least a threshold amount, determining probabilities of one or more shoppers selecting an order to be fulfilled during the time interval without the online concierge system offering an incentive for fulfilling the order, determining incentivized probabilities of the one or more shoppers selecting the order to be fulfilled during the time interval when the online concierge system offers each of one or more incentives for fulfilling the order, selecting an incentive for the online concierge system to offer for fulfilling the order based on differences between the probabilities and the incentivized probabilities;

receiving a request from a shopper for orders available to be fulfilled within the geographic location, each order including one or more items for the shopper to obtain;

transmitting an interface from the online concierge system to a shopper mobile application executing on a client device of the shopper, the interface including an instruction based on a highest predicted probability output by the retrained the machine-learned item availability model for a combination of the warehouse of the plurality of warehouses and the item, the interface displaying the selected incentive and the time interval when the selected incentive applies, and the interface displaying a map of the geographic location including representations of warehouses of the plurality of warehouses for fulfilling one or more orders in the geographic location with a representation of the warehouse of the plurality of warehouses to which the selected incentive applies visually distinguished from representations of one or more warehouses of the plurality of warehouses to which the selected incentive does not apply; and responsive to receiving a selection of the warehouse of the plurality of warehouses to which the selected incentive applies via the interface, displaying a notification identifying the estimated number of orders to be to be fulfilled for the warehouse of the plurality of warehouses during the time interval determined by the online concierge system from orders previously received by the online concierge system as an overlay on the map proximate to the representation of the warehouse of the plurality of the warehouses.

9. The method of claim 8, wherein the interface displays the selected incentive in conjunction with information identifying one or more orders to which the selected incentive applies.

10. The method of claim 8, wherein the interface describes the selected incentive in response to the time interval being within a threshold amount of time from a time when the interface is transmitted.

11. The method of claim 10, wherein the interface does not describe the selected incentive in response to the time interval being greater than the threshold amount of time from the time when the interface is transmitted.

12. The method of claim 8, wherein selecting the incentive for the online concierge system to offer for fulfilling the order based on differences between the probabilities and the incentivized probabilities comprises:

grouping shoppers based on probabilities of the shoppers selecting one or more orders to be fulfilled during the time interval when no incentive is offered, different groups including shoppers having probabilities within different ranges; and selecting an incentive from the one or more incentives for a group based on increases between probabilities of shoppers in the group selecting one or more orders during the time interval when no incentive is offered and incentivized probabilities of shoppers in the group selecting one or more orders during the time interval when different incentives are offered.

13. A computer program product comprising a non-transitory computer readable storage medium having instructions encoded thereon that, when executed by a processor, cause the processor to:

determine, by an online concierge system, an estimated number of orders to be fulfilled during a time interval from a plurality of warehouses based on orders previously received by the online concierge system for the plurality of warehouses;

training, by the online concierge system, a machine-learned item availability model to predict a probability of an item being available at a warehouse of the plurality of warehouses, by:

using training datasets that include warehouses, characteristics of items included in previously received orders, and times when previously received orders were received by the online concierge system;

receiving updated availability of a plurality of items at the plurality of warehouses from shoppers; and updating training datasets based on the updated availabilities of the plurality of items at the plurality of warehouses;

retraining the machine-learned item availability model by applying the machine learned-item availability model to the updated training datasets including the warehouses, the characteristics of items included in previously received orders, times when previously received orders were received by the online concierge system, and updated availabilities of the plurality of items at the plurality of warehouses received from the shoppers;

determine, by the online concierge system, an estimated number of shoppers available to fulfill received orders from the warehouse during the time interval from prior fulfillment of orders by shoppers;

responsive to the estimated number of orders exceeding the estimated number of shoppers by at least a threshold amount, determine probabilities of one or more shoppers selecting an order to be fulfilled during the time interval without the online concierge system offering an incentive for fulfilling the order, determine incentivized probabilities of the one or more shoppers selecting the order to be fulfilled during the time interval when the online concierge system offers each of one or more incentives for fulfilling the order, select an incentive for the online concierge system to offer for fulfilling the order based on differences between the probabilities and the incentivized probabilities;

receive a request from a shopper for orders available to be fulfilled, each order including one or more items for the shopper to obtain;

transmit an interface from the online concierge system to a shopper mobile application executing on a client device of the shopper, the interface including an instruction based on a highest predicted probability output by the retrained the machine-learned item availability model for a combination of the warehouse of the plurality of warehouses and the item, the interface describing the selected incentive and the time interval when the selected incentive applies, and the interface displaying a map of a geographic location including representations of warehouses for fulfilling one or more orders in the geographic location with a representation of the warehouse of the plurality of warehouses to which the selected incentive applies visually distinguished from representations of one or more warehouses of the plurality of warehouses to which the selected incentive does not apply; and responsive to receiving a selection of the warehouse of the plurality of warehouses to which the selected incentive applies via the interface, display a notification identifying the estimated number of orders to be to be fulfilled for the warehouse of the plurality of warehouses during the time interval determined by the online concierge system from orders previously received by the online concierge system as an overlay on the map proximate to the representation of the warehouse of the plurality of warehouses.

* * * * *